F. E. BOARDMAN.
SIGNAL SYSTEM AND CONTROL THEREFOR.
APPLICATION FILED JUNE 22, 1916.

1,217,558.

Patented Feb. 27, 1917.
3 SHEETS—SHEET 1.

Inventor
F. E. Boardman,
by
T. A. Witherspoon
Attorney

F. E. BOARDMAN.
SIGNAL SYSTEM AND CONTROL THEREFOR.
APPLICATION FILED JUNE 22, 1916.
1,217,558.
Patented Feb. 27, 1917.
3 SHEETS—SHEET 2.
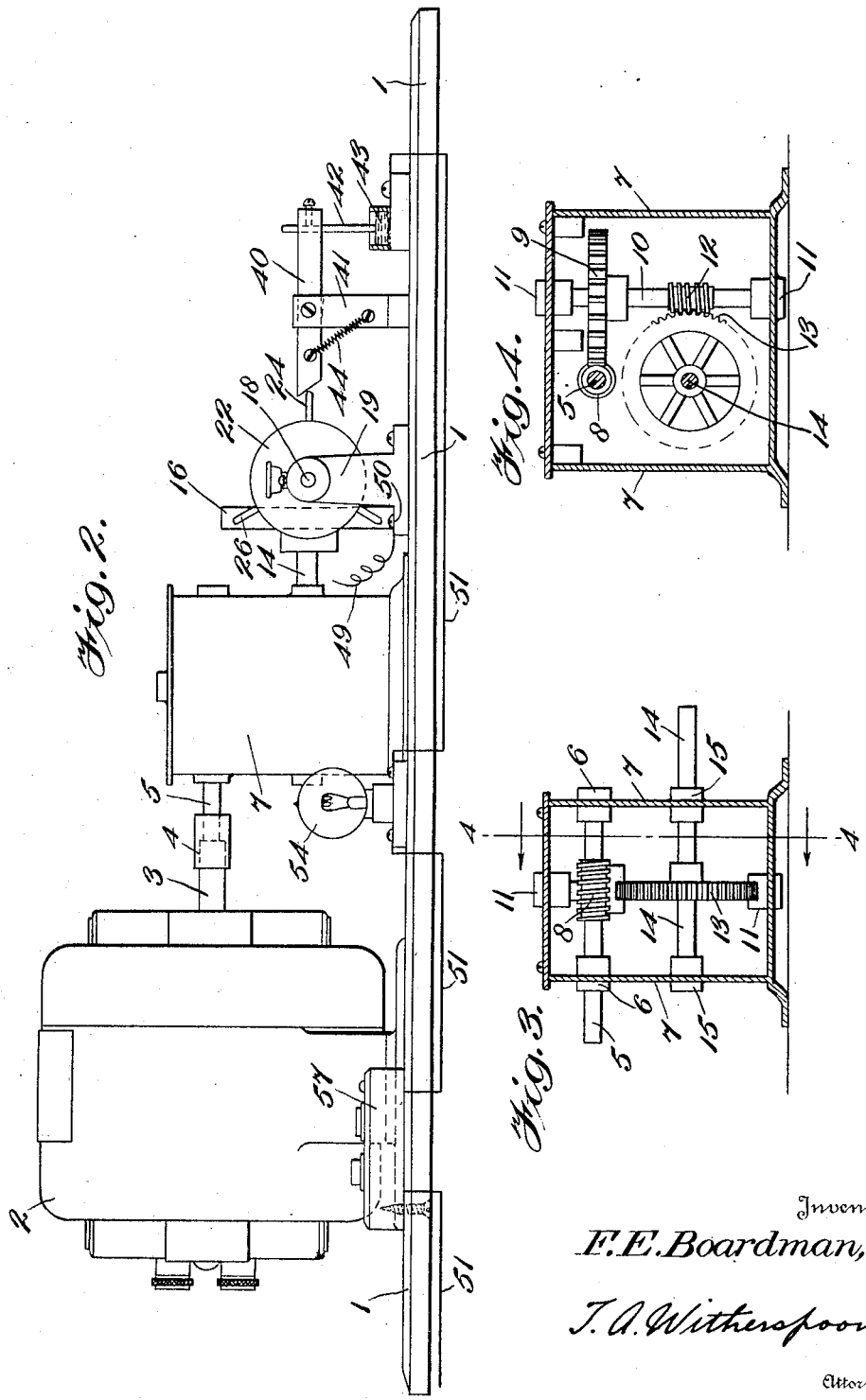
Inventor
F. E. Boardman, by
T. A. Witherspoon
Attorney

UNITED STATES PATENT OFFICE.

FRANK E. BOARDMAN, OF MEMPHIS, TENNESSEE.

SIGNAL SYSTEM AND CONTROL THEREFOR.

1,217,558.  Specification of Letters Patent.  Patented Feb. 27, 1917.

Application filed June 22, 1916. Serial No. 105,233.

*To all whom it may concern:*

Be it known that I, FRANK E. BOARDMAN, a citizen of the United States, residing at Memphis, in the county of Shelby and State of Tennessee, have invented certain new and useful Improvements in Signal Systems and Controls Therefor; and I do hereby declare the following to be a full, clear, and exact description of the invention, such as will enable others skilled in the art to which it appertains to make and use the same.

This invention relates to signal systems of general application but especially adapted for use in connection with elevators, and has for its object to provide a system of this nature and a control therefor which will be simple in construction, comparatively inexpensive to manufacture and more efficient in operation than those heretofore proposed.

With these and other objects in view, the invention consists in the novel details of construction and combinations of parts more fully hereinafter disclosed and particularly pointed out in the claims.

Referring to the accompanying drawings forming a part of this specification in which like numerals designate like parts in all the views:—

Fig. 2 is a side elevational view of the parts shown in Fig. 1;

Fig. 3 is a detail sectional view partly in elevation of the transmission gearing;

Fig. 4 is a detail sectional view taken on the line 4—4 of Fig. 3 looking in the direction of the arrows.

Figure 1:
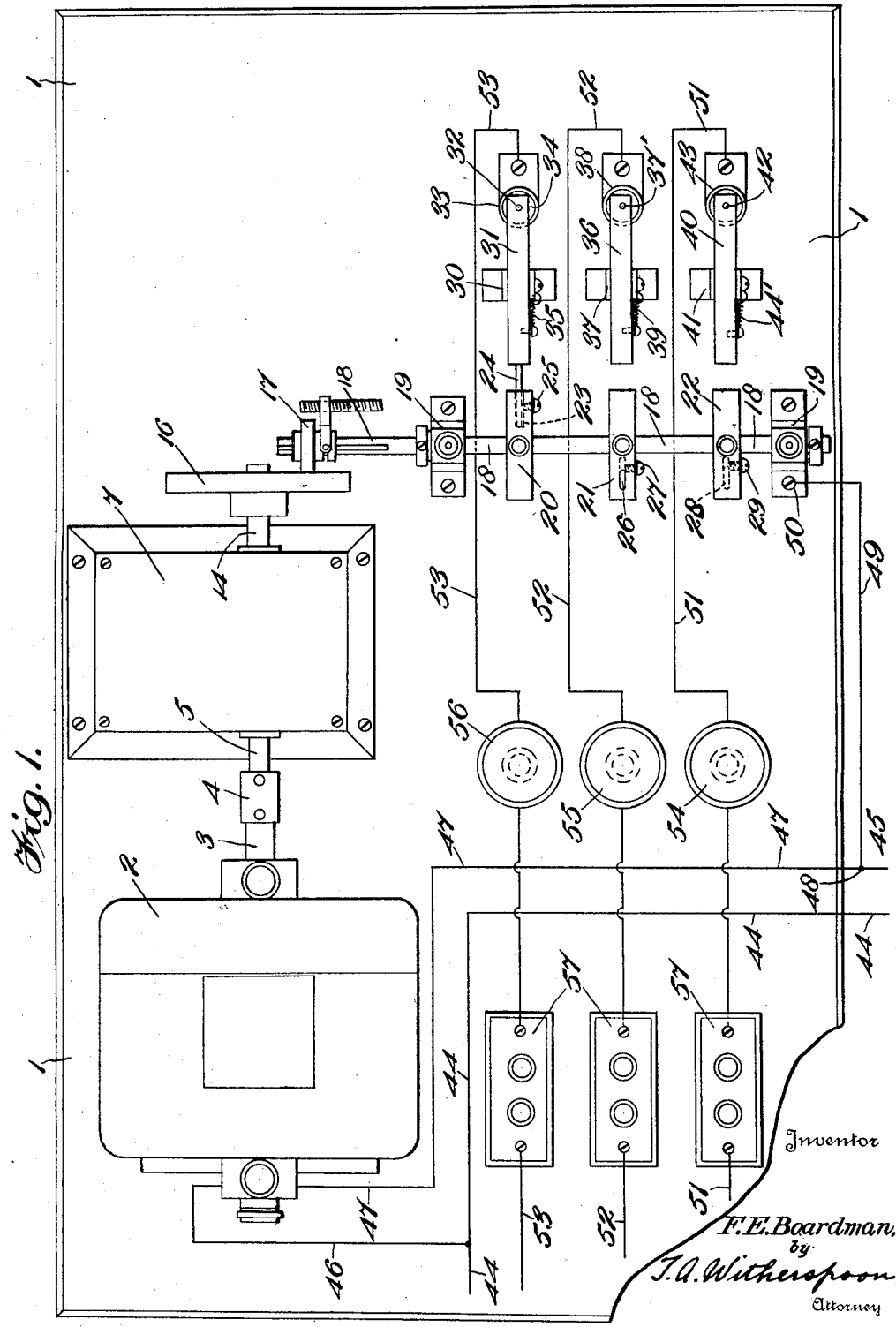
Figure 1 is a diagrammatic plan view of a control mechanism for the system made in accordance with this invention.

1 designates any suitable base upon which is mounted a motor 2 provided with a shaft 3 connected by a coupling 4 to a shaft 5, journaled in suitable bearings 6, carried by the housing 7 inclosing the reducing gears consisting of a worm 8 mounted upon the shaft 5 meshing with the worm wheel 9, mounted upon a shaft 10 at right angles to the said shaft 5 and revolving in suitable bearings 11 also carried by the housing or casing 7. The said shaft 10 also carries a worm 12 meshing with a worm wheel 13, mounted upon the shaft 14, journaled in suitable bearings 15 and carrying upon one end thereof a friction pulley 16, (see Fig. 1). The said friction pulley 16 is adapted to be engaged by a suitable friction pulley 17 splined on the shaft 18, all as will be clear from the drawings.

The shaft 18 is journaled in bearing 19 carried by the base 1 and has mounted upon it one or more circular disks 20, 21 and 22. The disk 20 is provided with a recess 23 into which is slidably fitted the pin 24 adapted to be adjusted and held as by the screw 25. In like manner the disk 21 is provided with a pin 26, and screw 27, while the disk 22 is provided with a pin 28 and screw 29.

Mounted in suitable bearings such as 41 and in alinement with the disk 22 is a lever 40 carrying at one end a wire or contact finger 42 preferably made of German silver. The said wire 42 is adapted to make and break circuit with the contact 43, all as will be clear from Figs. 1 and 2 of the drawings.

A spring such as 44' is provided to normally keep the wire 42 out of contact with the other contact 43 so as to maintain an open circuit. In like manner there is provided the lever 36 journaled in suitable bearings 37 mounted on the base 1 in alinement with the disk 21, said lever 36 being provided with a German silver contact wire 37' adapted to make circuit with the contact 38 and to close circuit therewith. A spring such as 39 is also provided to normally keep this circuit open. Again a lever such as 31, journaled in bearings 30 is provided in alinement with the disk 20 and carries at one end a contact wire 32 adapted to make contact with another contact 33. The said lever 31 is likewise controlled by a spring such as 35, all as will be clear from the drawings.

From what has been thus far disclosed, it will be clear that upon rotation of the motor shaft 3, power will be transmitted through the coupling 4 to the shaft 5, through the worm gear 8 to the worm wheel 9 carried by the shaft 10 from whence it will be further transmitted through the worm gear 12 and the worm wheel 13 to the shaft 14 and the friction disk 16. From the said friction disk 16 it will be transmitted to the companion friction wheel 17 and to the shaft 18 carrying the disks 20, 21 and 22. The rotation of these said disks will from time to time bring the fingers or pins such as 24, 26 and 28 into contact with the levers such as 31, 36 and 40 respectively, thereby depressing the contact wires such as 32, 37 and 42, and causing them to make circuit with their respective contacts 33, 38 and 43.

44 and 45 represent feed wires, and joined to said wires is the shunt circuit 46 and 47 in which is located the motor 2. Joined as at 48 to the feed 45 is the wire 49 connected as at 50 to the shaft 18 and control disks 20, 21 and 22. From each contact 43, 38 and 33 leads a return wire such as 51, 52 and 53, and in series with these return wires are the pilot lights 54, 55 and 56 respectively. 57 represents a switch or other circuit controller associated with each pilot light. After leaving the switches 57 the wires 51, 52 and 53 lead off to any desired signal system, as for example, such as is illustrated in Fig. 5.

Figure 5:
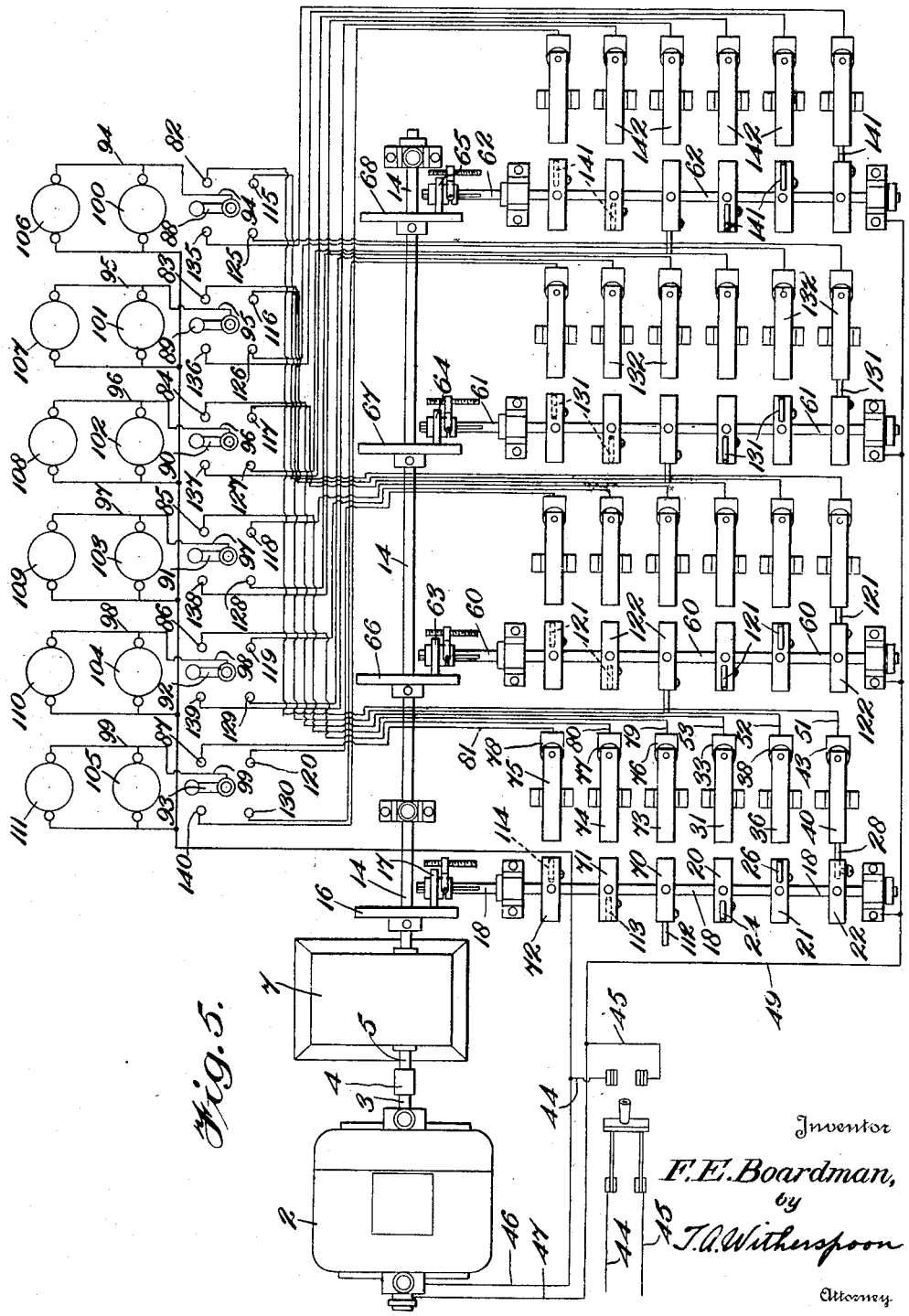
Fig. 5 is a diagrammatic plan view showing a slightly modified form of a system including its control adapted for use in connection with a plurality of elevators, suitable for an office building.

Coming now to the slightly modified construction illustrated in Fig. 5, instead of providing a single shaft 18, there is provided a plurality of shafts 18, 60, 61 and 62 there being one shaft for each schedule to be maintained. The said shafts 60, 61 and 62 are respectively provided with the friction disks 63, 64 and 65 engaging respectively the disks 66, 67 and 68, carried by the shaft 14, all as will be clear from Fig. 5.

Further, in the system disclosed in said Fig. 5, instead of providing the shaft 18 with only say three control disks 20, 21 and 22, I provide said shaft with as many control disks as there are elevators to be served, in this case six in all. The extra control disks on the shaft 18 are lettered 70, 71 and 72. There is also a control lever for each control disk, the said levers coacting with the shaft 18 being lettered 40, 36, 31, 73, 74 and 75. The contacts associated with these control levers are lettered 43, 38, 33, 76, 77 and 78. Leading from the respective last named contacts are the wires 51, 52, 53, 79, 80 and 81 respectively joined to the contacts or buttons 82, 83, 84, 85, 86 and 87. Respectively associated with said buttons are the levers 88, 89, 90, 91, 92 and 93, and respectively joined to said levers are the wires 94, 95, 96, 97, 98 and 99 connected respectively with the elevator signals 100, 101, 102, 103, 104 and 105. The said signals may be of any suitable character and number, and may be located in any suitable positions.

The said wires numbered from 94 to 99 inclusive, are further respectively joined with the signals 106, 107, 108, 109, 110 and 111 carried by the elevator.

The control pins 28, 26, 24, 112, 113, and 114 are angularly displaced as indicated so that as the shaft 18 is revolved by the disk 16, the control levers 40, 36, 31, 73, 74 and 75 will be successively operated and their corresponding circuits and signals on the floors of the building and on the elevator will likewise be successively operated, all as will be clear from Fig. 5 of the drawings.

In other words, supposing the levers 88, 89, 90, 91, 92 and 93 to be so turned as to make circuit with their respective contacts numbered from 82 to 87, and supposing the shaft 18 to be revolving at a speed governed by the position of the disk 17, then the signals corresponding to each elevator will be lighted successively in the various elevators and on the various floors or other places at which they may be located. That is to say, the shaft 18 and its associated parts constitutes a controller for a schedule on which the various elevators are run while the circuits corresponding to the other shafts are open. It often happens that the superintendent of a building wishes to change the schedule of the elevators. That is, he may wish to inaugurate a faster or a slower schedule to accommodate the traffic at different hours of the day, and when such is the case, this invention provides in said open circuits the means for accomplishing this purpose.

In other words, the disk 17 on the shaft 18 may be set for any desired speed of the motor 2, and after it is once set the shaft 18 will furnish a given schedule, say for example, a 60 second period between the startings of the various elevators from the bottom floor.

Now suppose that a 50 second period between the startings of the various elevators is desired. All that the elevator starter has to do, after the friction disk 63 on the shaft 60 has been once properly adjusted, is to shift the levers numbered from 88 to 93 respectively to the contacts 115, 116, 117, 118, 119, and 120 whereupon the circuits controlled by the schedule shaft 18 will be cut out and a similar set of previously open circuits controlled by the schedule shaft 60 will be cut in, all as will be clear from an inspection of Fig. 5, it being understood of course, that contact pins such as 121 are likewise associated with the contact disks such as 122 carried by the shaft 60, and that said contact pins 121 are angularly displaced as indicated.

In the same way, should the elevator starter wish for any reason to change the schedule of the elevators from a 50 second period to say a 40 second period, after the friction disk 64 of the schedule shaft 61 has been properly adjusted he next moves the controlling levers numbered from 88 to 93 from the contacts numbered from 115 to 120 respectively to the previously open contacts 125, 126, 127, 128, 129 and 130. An inspection of Fig. 5 will show when the said levers have thus made circuit with these last named contacts, that the schedule shaft 61 will, through its contact pins lettered 131, and its control levers lettered 132, cause successive circuits to be made through said contacts numbered from 125 to 130, and that thereupon successive signals will be shown on the elevators and on the various floors, all in a manner disclosed in connection with the schedule shaft 18.

Now should the elevator starter, for example, wish to still further change the schedule of his elevators from a 40 second period to say a 30 second period, after the friction disk 65 carried by the schedule shaft 62 has been properly adjusted, all he has to do is to shift his control levers, numbered from 88 to 93, from the contacts, numbered 125 to 130, respectively to the previously open contacts numbered 135, 136, 137, 138, 139 and 140, whereupon it will be evident that the schedule shaft 62 and its associated pins 141 and control levers 142 will make the proper circuits through said last named contacts, and will cause successive signals to be lighted on the elevators and on the various floors with a 30 second period between the same. Of course, changes of schedule could be carried on indefinitely by providing additional schedule shafts, but the above is sufficient to show that this system of signaling is sufficiently flexible to accommodate the requirements of any office building, no matter how large it may be.

It will thus be seen that this invention provides a plurality of schedule shafts 18, 60, 61, 62, adjusted to different speeds; that there are a plurality of signaling circuits controlled by each shaft; that for each car there is provided a group of contact buttons such for example, as 82, 115, 125, 135, each of which buttons is connected to a circuit controlled by a different schedule shaft; and that there is also provided a signal for each car, together with a single means for each group for joining said signal at will through the said contact buttons to any desired circuit, and thus cause the said signal on each car to be actuated or controlled by any particular schedule shaft that may be best suited to the existing conditions. In other words, all the cars may be run on a single schedule which schedule may be changed at will, or each car may be run on an independent schedule which last named schedule may be also changed by changing the speed of the shaft controlling said independent schedule.

It is also evident that various permutations or changes in the schedules for the different elevators may be readily brought about by having some of the levers such for example as 88 on one set of contacts such for example as 82, while others of the levers will be on other contacts such for example as 116, 120 or 138.

In other words, all sorts of changes and combinations of schedules may be readily had by merely shifting the control levers numbered from 88 to 93.

It is also evident that this same system of signaling is useful for automatic signs, for cars, trains, and in fact wherever a variation of schedule is desired, and wherever a ready, simple and systematic control thereof is of value.

It is obvious that those skilled in the art may vary the details of construction as well as the arrangement of parts without departing from the spirit of the invention, and therefore, it is not desired to limit this invention to the above disclosure, except as may be required by the claims.

What is claimed is:—

1. In a signal system the combination of a plurality of schedule shafts; means to rotate said shafts at different speeds; a plurality of signal circuits, one for each shaft; a plurality of contact buttons, one for each circuit, arranged in a group; and a single means associated with said group for successively cutting in and cutting out each circuit at will, substantially as described.

2. In a signal system the combination of a plurality of schedule shafts; means to rotate said shafts at different speeds; a plurality of signal circuits associated with each shaft provided with contact buttons arranged in a plurality of groups, each group containing one button pertaining to a circuit of each shaft; and a single means for successively cutting in and cutting out each circuit of a group at will, substantially as described.

3. In a signal system the combination of a plurality of schedule shafts; means to rotate said shafts at different speeds; a plurality of circuits adapted to control signals associated with each shaft; a pair of contacts in each circuit controlled by its respective shaft; a contact button associated with each circuit, said buttons being arranged in a plurality of groups, each group comprising one button pertaining to a circuit controlled by a different shaft; and a single means for cutting in and cutting out at will each circuit of a group, substantially as described.

4. In a signal system the combination of a source of power; a friction disk driven from said source; a second friction disk contacting with said first named disk; a schedule shaft; means associated with said second named disk for varying the speed of said shaft; a plurality of angularly disposed pins carried by said shaft; a series of circuit controllers successively actuated by said pins; a circuit associated with each of said controllers adapted to actuate a signal; a contact button associated with each circuit, said buttons being arranged in a plurality of groups, each group comprising buttons pertaining to circuits controlled by different shafts; and a single means for cutting in and cutting out at will each circuit of a group, substantially as described.

5. In a signal system the combination of a source of power; a plurality of schedule shafts adapted to be driven at different speeds from said source; a plurality of angularly displaced members carried by each of said shafts; a plurality of circuit controllers associated with each shaft comprising pivoted levers located in the path of and adapted to be actuated by said members; a circuit adapted to operate a signal associated with each of said controllers; a contact button associated with each circuit, said buttons being arranged in a plurality of groups, each group comprising buttons pertaining to circuits controlled by different shafts; and a single means for cutting in and cutting out at will each circuit of a group, substantially as described.

6. In a signal system the combination of a source of power; a friction disk driven from said source; a schedule shaft; means slidably mounted on said shaft and coacting with said friction disk for controlling the speed of said shaft; a plurality of angularly disposed pins carried by said shaft; a series of circuit controllers comprising pivoted levers successively actuated by said pins; a second friction disk driven from said source of power; a second schedule shaft; means coacting with said second friction disk for varying the speed of said second shaft; a plurality of angularly disposed pins carried by said second shaft; a second series of circuit controllers comprising pivoted levers successively actuated by said second pins; a plurality of signal circuits adapted to operate signals associated with said controllers; and means for connecting said signals with said first series or said second series of controllers at will, substantially as described.

7. In a signal system the combination of a source of power; a friction disk driven from said source of power; a schedule shaft driven from said disk; means for controlling the speed of said shaft; a plurality of disks mounted on said shaft; a plurality of pins mounted in said disks in angularly displaced relation; a series of levers successively actuated by said pins; a plurality of contacts arranged in pairs, each pair being controlled by one of said levers; a second friction disk; a second schedule shaft driven from said second disk; means for controlling the speed of said second shaft; a plurality of disks mounted on said second shaft; a plurality of pins mounted in said second mentioned disks in angularly displaced relation; a second series of levers successively actuated by said second pins; a second set of contacts arranged in pairs each pair being controlled by one of said second levers; a plurality of signal circuits adapted to operate signals controlled by said contacts; and means for joining said signals to said first set and to said second set of contacts at will, substantially as described.

In testimony whereof I affix my signature, in presence of two witnesses.

FRANK E. BOARDMAN.

Witnesses:
JOHN VORDER BRUEGGE,
R. FRANKEY.

Copies of this patent may be obtained for five cents each, by addressing the "Commissioner of Patents, Washington, D. C."